(12) United States Patent
Jin et al.

(10) Patent No.: US 10,059,176 B2
(45) Date of Patent: Aug. 28, 2018

(54) TRIM PANEL ASSEMBLIES OF A VEHICLE AND METHODS OF ASSEMBLING THE SAME

(71) Applicant: Ford Global Technologies, LLC, Dearborn, MI (US)

(72) Inventors: Xuezhi Jin, Nanjing (CN); Yalin Zhang, Nanjing (CN); Wei Xu, Nanjing (CN); Kevin Shen, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/451,180

(22) Filed: Mar. 6, 2017

(65) Prior Publication Data

US 2017/0267072 A1  Sep. 21, 2017

(30) Foreign Application Priority Data

Mar. 17, 2016 (CN) .......................... 2016 1 0152942

(51) Int. Cl.
  *B60J 5/04* (2006.01)
(52) U.S. Cl.
  CPC ........... *B60J 5/0413* (2013.01); *B60J 5/0468* (2013.01); *B60J 5/0469* (2013.01); *B60J 5/0481* (2013.01)
(58) Field of Classification Search
  CPC ....... B60J 5/0413; B60J 5/0468; B60J 5/0469
  USPC .................................. 296/146.7, 39.1, 1.08
  See application file for complete search history.

(56) References Cited

U.S. PATENT DOCUMENTS

| | | | | |
|---|---|---|---|---|
| 5,297,842 A | * | 3/1994 | Hayashi | .................. B29C 51/12 296/146.7 |
| 5,565,659 A | * | 10/1996 | Moner, Jr. | ............. H04R 1/023 181/141 |
| 5,639,140 A | * | 6/1997 | Labrash | .............. B60R 11/0217 181/150 |
| 6,039,465 A | * | 3/2000 | Hirabayashi | ........... B60Q 1/007 296/37.1 |
| 7,005,092 B2 | | 2/2006 | Dooley et al. | |
| 7,105,125 B2 | | 9/2006 | Obara | |
| 8,343,607 B2 | | 1/2013 | Pokorzynski et al. | |
| 8,458,905 B2 | | 6/2013 | Fox | |

(Continued)

OTHER PUBLICATIONS

"How to Sew Automotive Trim", Jul. 10, 2014, http://www.geeksoncars.com/how_7864538_sewautomotivetrim.html.

*Primary Examiner* — Dennis H Pedder
(74) *Attorney, Agent, or Firm* — Vichit Chea; Mohr IP Law Solutions, PC

(57) ABSTRACT

The present disclosure provides a trim panel assembly of a vehicle. The trim panel assembly includes a first member having a first surface and a second surface, and including a first assembling area, a first groove positioned on the first surface along a peripheral of the first assembling area, and a plurality of first through-holes positioned in the first groove and spaced apart from each other; and a second member including a first main body corresponding to the first assembling area, and a plurality of leg portions extending from the first main body. The plurality of the first leg portions correspond to the plurality of the first through-holes, respectively, and the plurality of the first leg portions pass through corresponding a plurality of the first through-holes, extend onto and connect to the second surface of the first member.

18 Claims, 4 Drawing Sheets

A-A

(56) References Cited

U.S. PATENT DOCUMENTS

2006/0265963 A1* 11/2006 Winborn ................ B60J 5/0418
  49/502
2008/0258496 A1* 10/2008 Foster ................. B60R 13/0206
  296/146.7
2012/0326467 A1  12/2012 McClintock et al.

* cited by examiner

A-A

B-B

TRIM PANEL ASSEMBLIES OF A VEHICLE AND METHODS OF ASSEMBLING THE SAME

RELATED APPLICATION

This application claims the benefit of Chinese Patent Application No.: CN 201610152942.0 filed on Mar. 17, 2016, the entire contents thereof being incorporated herein by reference.

FIELD

The present disclosure relates to a trim panel assembly of a vehicle and a method of assembling the same.

BACKGROUND

In order to create a feeling of comfort and luxury, material such as leather is often employed to cover an interior part, such as vehicle door trim panel. Due to soft property of the leather material, it can be difficult to assemble the leather to the vehicle door trim panel in an efficient manner. One solution is to form the intermediate part firstly, then connect the leather to the intermediate part, and finally connect the intermediate part to the vehicle door trim panel, for instance via welding.

The above solution is not only time inefficient, but also noise may be caused by the connection between the intermediate part and the vehicle door trim panel.

SUMMARY

According to one aspect of the present disclosure, a trim panel assembly of a vehicle is provided. The trim panel assembly includes a first member having a first surface and a second surface, and including a first assembling area, a first groove positioned on the first surface along an edge or a peripheral of the first assembling area, and a plurality of first through-holes positioned in the middle of the first groove and spaced apart from each other; and a second member including a first main body corresponding to the first assembling area, and a plurality of leg portions extending from the first main body. The plurality of the first leg portions respectively correspond to the plurality of the first through-holes, and the plurality of the first leg portions pass through the corresponding plurality of the first through-holes and extend on and connect to the second surface of the first member.

In one embodiment, an edge portion of the first main body extends into the first groove.

In another embodiment, the first member is the vehicle door trim panel is made from plastic.

In another embodiment, the second member is a cover layer and is made from leather, imitation leather or fiber material.

In another embodiment, the plurality of the first leg portions are connected to the second surface of the first member via adhesive.

In another embodiment, trim panel assembly further comprises a third member, the third member including a second main body and a plurality of second leg portions. The first member further includes a second assembling area corresponding to the third member, the first assembling area has a side common with the second assembling area, and the first member includes a second groove positioned on the first surface thereof along an edge of the second assembling area and a plurality of second through-holes positioned in the middle of the second groove and spaced apart from each other. The plurality of the second leg portions of the third member respectively correspond to and pass through the plurality of the second through-holes and extend on the second surface of the first member.

In another embodiment, the first through-holes positioned in a portion of the first groove on the common side are configured to receive both the corresponding first and second leg portions, and the second leg portions of the third member corresponding to the common side pass through the corresponding first through-holes and extend on the second surface of the first member.

In another embodiment, the first grooves positioned on the common side are configured to receive the edge portion of the second member and the edge portion of the third member corresponding to the common side.

According to another aspect of the disclosure, a trim panel assembly of a vehicle is provided. The trim panel assembly includes a vehicle door trim panel including a visible surface, an invisible surface, an assembling area, a continuous groove recessed from the visible surface around the assembling area, and a plurality of through-hole positioned in the groove, the plurality of through-holes being spaced apart from each other; and a cover layer including a main body corresponding to the assembling area and a plurality of leg portions extending from the main body, the plurality of leg portions respectively corresponding to the plurality of through-holes. The cover layer is positioned on the assembling area of the vehicle trim panel and each leg portion of the cover layer passes through a corresponding through-hole and is connected to the invisible surface of the vehicle door trim panel.

In one embodiment, an adhesive layer is positioned between each of the leg portions and the vehicle door trim panel.

In another embodiment, a width of the groove is larger than a thickness of the cover layer.

In another embodiment, the main body includes an edge portion which extends into the groove.

In another embodiment, an adhesive layer is positioned adjacent to a place between the edge portion of the groove and the groove.

In another embodiment, the side wall of the groove is substantial perpendicular to the invisible surface of the vehicle door trim panel.

In another embodiment, a side wall of the groove and the invisible surface of the vehicle door trim panel define an angle.

In another embodiment, each of the leg portions passes through the corresponding through-hole extends in a direction away the main body on the invisible surface.

According yet another aspect of the present disclosure, a method of assembling a local cover member to a vehicle trim panel is provided. The method includes forming a trim panel including a groove positioned on a first surface along a peripheral of the first assembling area, and a plurality of through-holes positioned in the first groove and spaced apart from each other; forming a local cover member corresponding to the assembling area, the cover member including a main body and a plurality of leg portions extending from the main body; passing each of the leg portions through the corresponding through-holes and contacting each of the leg portions with the second surface of the trim panel; and connecting the plurality of leg portions to the second surface of the trim panel.

In one embodiment, the trim panel is formed via injection-mold.

In another embodiment, the step of connecting the plurality of leg portions to the second surface of the trim panel includes employing an adhesive material.

In another embodiment, the cover member is made of leather, imitation leather or fiber material, and forming the local cover member includes cutting the leather, imitation leather or fiber material into the main body and the plurality of leg portions.

In another embodiment, the method further comprises positioning an edge portion of the main body into the groove.

One or more advantageous features as described herein are believed to be readily apparent from the following detailed description of one or more embodiments when taken in connection with the accompanying drawings.

DETAILED DESCRIPTION

Figure 1:
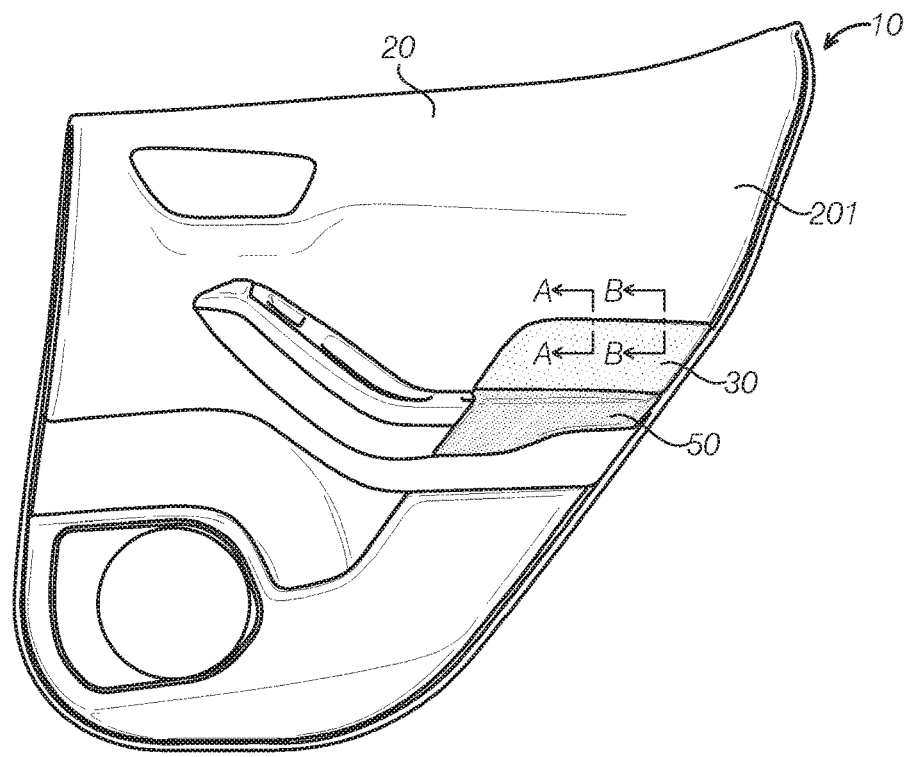
FIG. 1 depicts a trim panel assembly in a vehicle according to one or more embodiments of the present disclosure.

As referenced in the figures, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present disclosure provides a trim panel assembly of a vehicle and a method assembling the same. The trim panel assembly of the present disclosure includes a groove positioned along the assembling area of the trim panel and a plurality of through-holes positioned in the groove and spaced apart from each other and a cover layer connected directly to the trim panel via the through-house. As such, an intermediate layer can be omitted and thus reducing or eliminating noise associated with the connection via the intermediate part. The groove and the through-hole configuration is particular beneficial in assembling a soft layer or a deformable layer to the trim panel.

FIG. 1 depicts a trim panel assembly 10 in a vehicle. The trim panel assembly 10 may be a door trim panel assembly of a vehicle. It should be understood that the trim panel assembly of the present disclosure may be at any other suitable place rather than being limited to interior of the vehicle. In one or more embodiments, the trim panel assembly 10 includes a trim panel 20 having a first surface 201 and a second surface 203 (refer to FIG. 6A and FIG. 6B) and first and second cover layers 30, 50. In the embodiment where the trim panel assembly 10 is a vehicle door trim panel assembly, the first surface 201 and second surface 203 of the trim panel 20 may correspond to inner surface (visible surface) and outer surface (invisible surface), respectively. In other embodiments, for instance the trim panel assembly 10 may be a seat armrest, the first surface 201 and second surface 203 of the trim panel 20 may correspond to upper surface (visible surface) and lower surface (invisible surface), respectively.

The first cover layer 30 and second cover layer 50 may be assembled onto the trim panel 20 and be of different shape to accommodate for specific application. The trim panel 20 may be made from plastic material, such as Polypropylene (PP) or Acrylonitrile butadiene styrene (ABS).

Figure 2:
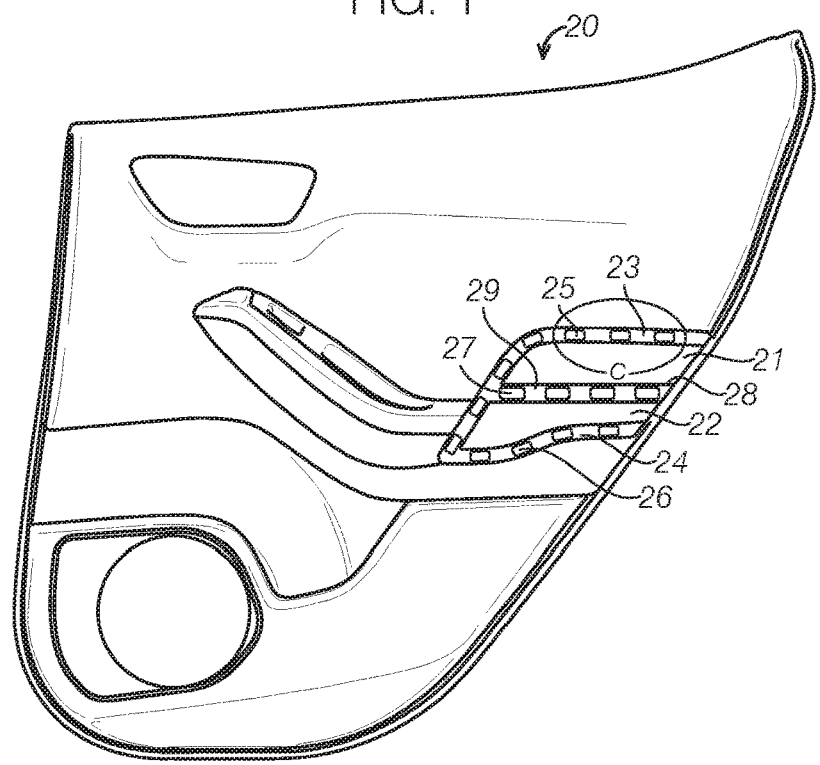
FIG. 2 depicts the trim panel referenced in FIG. 1, illustrating a configuration of the trim panel assembly 10 after the first and second cover layers 30, 50 being removed.

FIG. 2 illustrates a configuration of the trim panel assembly 10 after the first and second cover layers 30, 50 being removed. In one or more embodiments, the trim panel 20 includes a first assembling area 21 and a second assembling area 22 being adjacent to the first assembling area 21. It should be understood that the first and second assembling areas 21, 22 may be spaced apart each other. The first assembling area 21 and the second assembling area 22 may be of different shape and size. In one or more embodiments, the trim panel 20 may include a substantial flat portion and non-flat portion, i.e. arc portion. The assembling area may be divided into a first assembling area 21, a second assembling area 22 or more based on the shape of the trim panel 20. For instance, the first assembling area 21 may be a flat assembling area, and the second assembling area 22 may be a non-flat assembling area. This configuration is beneficial in its easiness to assemble the cover layers 30, 50 onto the trim panel 20, and well fit the cover layers 30, 50 to the trim panel 20 after an assembling.

Figure 5:
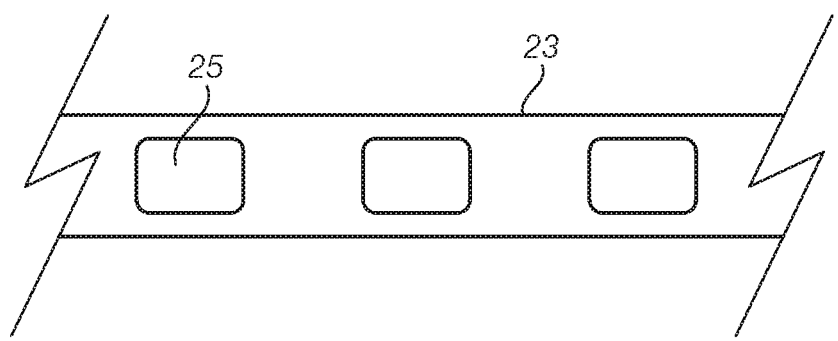
FIG. 5 depicts a partially enlarged view of area designated by C referenced in FIG. 2.

Continuing to refer to FIG. 2 and in further reference with FIG. 5, the trim panel 20 includes a first groove 23 positioned on the first surface 201 along a periphery of the first assembling area 21 and a plurality of first though-holes 25 positioned in the first groove 23. In one or more embodiments, the trim panel 20 further includes a second groove 24 positioned on the first surface along a periphery of the second assembling area 22 and a plurality of second through-holes positioned in the first groove 26. The first assembling area 21 and the second assembling area 22 may have a common side 28. The first groove 23 is partially on the common side 28, or it may also be understood that the second groove 24 is on the common side 28. That is to say, a common groove is position on the common side 28.

Figure 3:
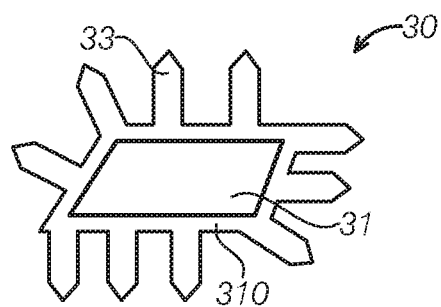
FIG. 3 depicts a first cover layer referenced in FIG. 1.
Figure 4:
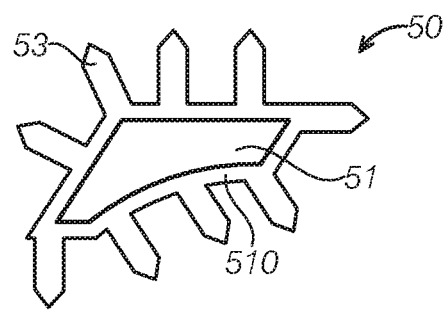
FIG. 4 depicts a second cover layer referenced in FIG. 1.

FIG. 3-4 schematically depicts the first cover layer 30 and the second cover layer 50 referenced in FIG. 1, respectively. Referring back to FIG. 2, and in further reference with FIG. 3-4, in one or more embodiments, the first and second cover layer 30, 50 may be made from one of leather, imitation leather or fiber materials. The first cover layer 30 may be made of different material from the second cover layer 50 as needed. The first cover layer 30 includes a first main body 31 and a plurality of first leg portions 33 extending from the first main body 31. The plurality of the first leg portions 33 respectively correspond to the plurality of the first through-holes 25 of the trim panel 20 and may be spaced apart from each other along an edge portion 310 of the first main body 31 and circumferentially extend out, i.e. away from the first main body 31. The second cover layer 50 includes a second main body 51 and a plurality of second leg portions 53 extending from the second main body 51. The plurality of the second leg portions 53 respectively correspond to the plurality of the second through-holes 26 of the trim panel 20 and may be spaced apart from each other along an edge portion 510 of the second main body 51 and circumferentially extend out, i.e. away from the second main body 51. The shape and size of the first and second main body 31, 51 may respectively correspond to the first and second assembling area 21, 22 of the trim panel 20.

Figure 6A:
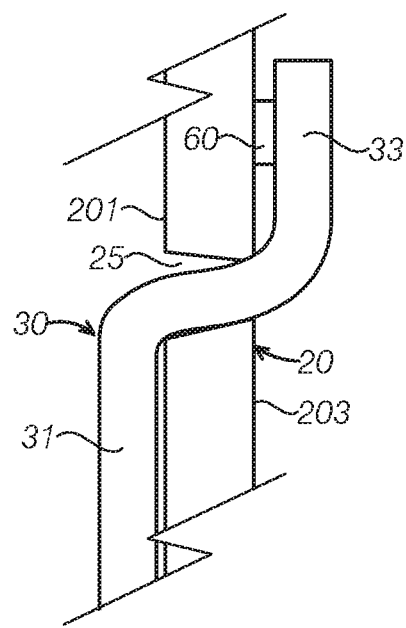
FIG. 6A depicts a cross-sectional view along A-A line referenced in FIG. 1.

FIG. 6A depicts a cross-sectional view of the trim panel assembly 10 along line A-A in FIG. 1, which illustrates the first cover layer 30 and the first leg portions 33 at an assembled position. As depicted in FIG. 6A, one of the first leg portion 33 passes through the first through-hole from the first surface 201 and extends on and connects to the second surface 203 of the trim panel 20. In one or more embodiments, the shape of the through-holes 25 may roughly be V-shape so as to guide the plurality of the first leg portions 33 to pass. It is noted that the through-holes 25 may be any suitable shape. In one or more embodiments, an adhesive 60 may be positioned between the second surface 203 of the trim panel 20 and each of the first leg portions 33, may be bonded or connected to the second surface 203 of the trim panel 20 via the adhesive 60. Connection via the adhesive can be an efficient and low cost approach. However, in other embodiments, the first leg portions 33 may be connected to the second surface 203 of the trim panel 20 by other various methods, such as mechanical fastener or welding.

FIG. 6A depicts a view that the first leg portion 33 passes through the corresponding first through-hole 25 and extends in a direction away from the first main body 31 on the second surface 203 of the trim panel. In another embodiment, the first leg portions 33 may pass through the corresponding first through-hole 25 and extends on the second surface 203 in a direction toward the first main body 31. Further, in the embodiment where the first assembling area 21 and the second assembling area 22 are positioned adjacent to each other as described above, the first leg portions 33 and the second leg portions 53 may pass through the corresponding first through holes 25 and second through holes 26, respectively, and extend on the second surface 203 in a different direction.

Figure 6B:
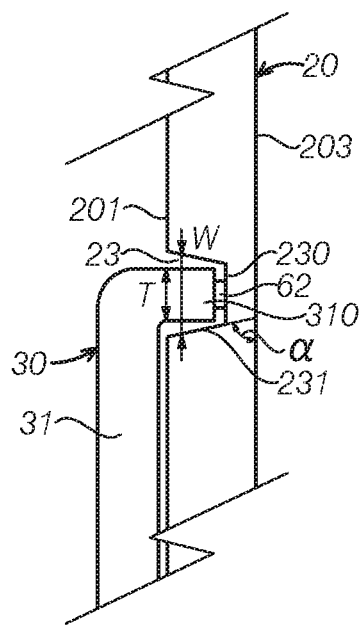
FIG. 6B depicts a cross-sectional view along B-B line referenced in FIG. 1.

FIG. 6B depicts a cross-sectional view of the trim panel assembly 10 along line B-B in FIG. 1, which illustrates the assembly of the first main body 31 of the first cover layer 30 at an assembled position. The edge portion 310 of the first main body 31 bends and extends into the first groove 23 of the trim panel 20. In one or more embodiments, an adhesive 62 may be disposed between the edge portion 310 and the first groove 23, for instance the adhesive 62 may be positioned between the edge portion 310 and a bottom 230 of the first groove 23, or between the edge portion 310 and a side wall 231 of the first groove 23. In some embodiments, the trim panel assembly 10 of the present disclosure may not have an adhesive disposed between the edge portion 310 and the first groove 23, rather the first main body 31 and the edge portion 310 may be secured via a plurality of the first leg portion 33 only.

Similarly, the second cover layer 50 may be assembled to the second assembling area 22 of the trim panel 20. A plurality of second leg portions 53 are configured to correspond to a plurality of the second through-holes 26, which pass through the plurality of the second through-holes 26 and extend to the second surface 203 of the trim panel 20. An adhesive may be positioned between the second surface 203 of the trim panel 20 and each of the second leg portions 53, and the leg portions 53 may be bonded or connected to the second surface 203 of the trim panel 20 via the adhesive. The first through-holes 27 in a portion 29 of first groove 23 positioned on the common side 28 may be configured to receive the corresponding first leg portions 33 of the first cover layer 30 and the second leg portions 53 of the second cover layer 50. The second leg portions 53 of the second cover layer 50 corresponding to the common side 28 pass through the corresponding first through-holes 27 and extend on the second surface 203 of the trim panel 20. The portion 29 of the first groove 23 positioned on the common side 28 may be configured to receive the edge portion 310 of the first cover layer 30 and the edge portion 510 of the second cover layer 30 corresponding to the common side 28.

In one or more embodiments, the width W of the grooves 23, 24 of the trim panel 20 may be larger than thickness T of the cover layers 30, 50. In the embodiment where the first assembling area and the second assembling area 22 are positioned adjacent to each other, the width of the portion of the first groove 23 positioned on the common side 28 may be slightly larger than the sum of the thickness of the first cover layer 30 and the second cover layer 50, while the width of the other portion of the groove 23 may slightly be larger than the thickness of the first cover layer 30, and the width of the second groove 24 may be slightly larger than the thickness of the second cover layer 50, thus an appealing appearance may be achieved. Furthermore, to simplify the manufacturing of the trim panel, the width of each of the first groove 23 and the second groove 24 may be configured to be slightly larger than the sum of the thickness of the first cover layer 30 and the second cover layer 50.

Although the first assembling area 21 and the second assembling area 22 are depicted to be adjacent to each other, it should be understood that the first and second assembling area 21, 22 may also be spaced apart from each other, or only one assembling area, such as the first assembling area may be disposed on the trim panel 20. According to another aspect of the present disclosure, in one or more embodiments, a trim panel assembly 10 of a vehicle is provided. The trim panel assembly 10 includes a door trim panel 20 having a visible surface 201 and an invisible surface 203, an assembling area 21, a continuous groove 23 recessed from the visible surface 201, and a plurality of through-holes 25 positioned in the groove 23 and spaced apart from each other at a certain distance; and a cover layer including a main body corresponding to the assembling area 21, and a plurality of leg portions 33 extending from the main body 31. The plurality of the leg portions 33 correspond to the plurality of the through-holes 25, respectively. The cover layer 30 is positioned on the assembling area 21 of the door trim panel 20 and each of the leg portions 33 passes through the corresponding through-holes 25 and connects to the invisible surface 203 of the door trim panel 20.

In another embodiment, the side wall 231 of the groove 23 is substantially perpendicular to the invisible surface 203 of the door trim panel 20, such as with an angle α of 85-90 degrees between the side wall 231 and the invisible surface 203 of the door trim panel 20. It should be understood that the angle may be varied if necessary.

In the depicted embodiment in FIG. 6A, the leg portions 33 are depicted to pass through the through-hole 25 and extend on the invisible surface in a direction away from the main body 31. Alternatively, in some embodiments, each of the leg portions 33 may pass through the corresponding through-holes 25 and extend on the invisible surface in a direction toward the main body 31.

Figure 7:
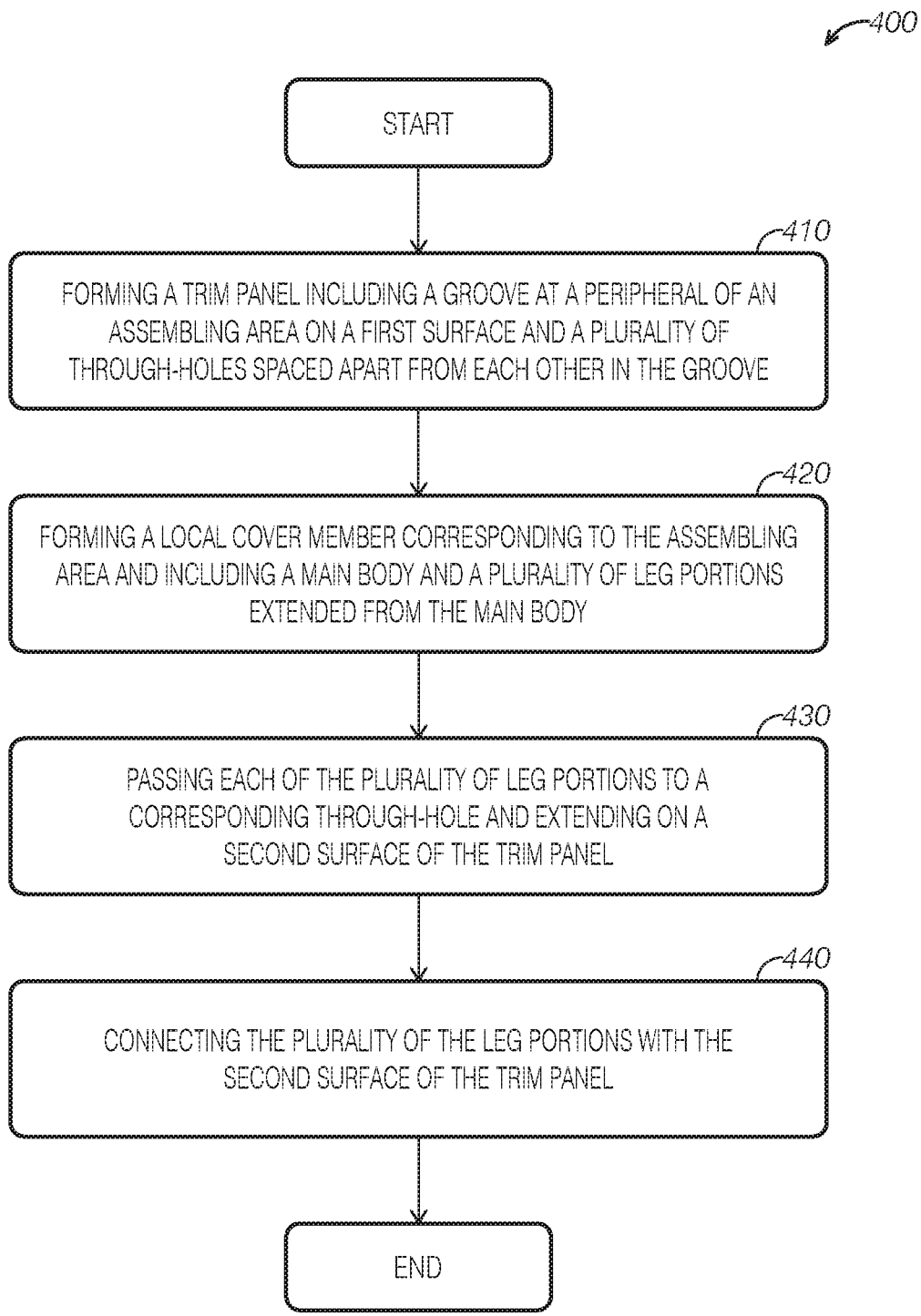
FIG. 7 depicts a flow chart illustrating a method of assembling a local cover member onto the vehicle door trim panel according to one or more embodiments of the present disclosure.

FIG. 7 is a flowchart illustrating a method 400 of assembling a local cover member onto a vehicle trim panel according to one or more embodiments of the present disclosure. At 410, the method 400 includes forming a trim panel 20. In some embodiments, the trim panel 20 includes a groove 23 formed around an assembling area 21 of the first surface 201 or along a peripheral of the assembling area 21 and a plurality of through-holes 25 formed in the groove 23 and spaced apart from each other. In one embodiment, the trim panel 20 is formed via an injection mold, and the groove 23 and a plurality of the through-holes 25 may be integrally formed during the injection mold. It should be understood that the trim panel 20, the groove 23 and the through-holes 25 may be formed separately, for instance, the groove 23 and the through-hole 25 may be formed via any suitable method, including but not limited to laser scoring, sonic knife, or hot knife processing after forming the trim panel 20.

At 420, the method 400 includes forming a local cover member 30 corresponding to the assembling area 21. The cover member 30 includes a main body 31 and a plurality of leg portions 33 extending from the main body 31. In one embodiment, the cover member 30 may be made from one of leather, intimation leather or fiber material. Forming the local cover member includes cutting one of the leather, the intimation leather or the fiber material into the main body 31 and a plurality of the leg portions 33. It should be understood that local cover member 30 may be formed via any suitable method.

At 430, the method 400 includes passing each of the leg portions 33 through a corresponding through-holes 25 from the first surface 201 of the trim panel 20 and extending the leg portions 33 on the second surface 203 of the trim panel 20. In another embodiment, the method 400 further includes positioning the edge portion 310 of the main body 31 into the groove 23.

At 440, the method 400 includes connecting the plurality of the leg portions 33 with the second surface 203 of the trim panel 20. In one embodiment, connecting a plurality of the leg portions 33 and the second surface 201 of the trim panel 20 includes connecting via an adhesive material.

The trim panel assembly of the present disclosure connects the local cover member directly onto the trim panel and thus avoiding connection between an intermediate part and a plurality of part, reducing assembling time and potential noise source. Further, some tools may be eliminated. It is easy to assemble flexible or deformable cover layer and maintain overall appearance integrity of the trim panel assembly by employing a groove positioned around the assembling area of the trim panel and a plurality through-holes positioned in the groove and spaced apart from each other.

While the present invention has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Those skilled in the art will understand that the disclosed examples may be varied, modified, and altered without departing from the scope of the inventions described herein.

The invention claimed is:

1. A trim panel assembly of a vehicle, comprising:
  a first member having a first surface and a second surface, wherein the first member includes a first assembling area and a second assembling area, a first groove positioned on the first surface along a peripheral of the first assembling area, a plurality of first through-holes positioned in the first groove and spaced apart from each other, a second groove positioned on the first surface along a peripheral of the second assembling area and a plurality of second through-holes positioned in the second groove and spaced apart from each other, and wherein the first assembling area has a common side with the second assembling area;
  a second member including a first main body corresponding to the first assembling area, and a plurality of first leg portions extending from the first main body; and
  a third member including a second main body corresponding to the second assembling area, and a plurality of second leg portions extending from the second main body;
  wherein the plurality of the first leg portions pass through the corresponding plurality of the first through-holes, extend onto and connect to the second surface of the first member, and
  wherein the plurality of the second leg portions of the third member pass through the corresponding plurality of the second through-holes, extend onto the second surface of the first member and connect to the second surface of the first member.

2. The trim panel assembly of claim 1, wherein an edge portion of the first main body extends into the first groove.

3. The trim panel assembly of claim 1, wherein the first member is a vehicle door trim panel and is made from plastic.

4. The trim panel assembly of claim 3, wherein the second member is a cover layer and is made from leather, imitation leather or fiber material.

5. The trim panel assembly of claim 1, wherein the plurality of the first leg portions are connected to the second surface of the first member via adhesive.

6. The trim panel assembly of claim 1, wherein the first through-holes positioned in a portion of the first groove on the common side are configured to receive the corresponding first and second leg portions, and the second leg portions of the third member corresponding to the common side pass through the corresponding first through-holes and extend to the second surface of the first member.

7. The trim panel assembly of claim 6, wherein the first groove positioned on the common side is configured to receive an edge portion of the second member and an edge portion of the third member corresponding to the common side.

8. A trim panel assembly of a vehicle, comprising:
  a door trim panel including a visible surface, an invisible surface, a first assembling area, a continuous groove recessed from the visible surface around the first assembling area, and a plurality of first through-hole positioned in the groove, the plurality of first through-holes being spaced apart from each other; and
  a first cover layer including a first main body corresponding to the first assembling area and a plurality of first leg portions extending from the first main body and corresponding to the plurality of first through-holes, respectively, wherein the first cover layer is made from leather, imitation leather or fiber material;
  wherein the first cover layer is positioned on the first assembling area of the door trim panel, and each first leg portion passes through a corresponding first through-hole, extends along the invisible surface and is connected to the invisible surface of the door trim panel via an adhesive layer, and the first main body of first cover layer substantially contacts the door trim panel.

9. The trim panel assembly of claim 8, wherein a width of the groove is larger than a thickness of the first cover layer.

10. The trim panel assembly of claim 8, wherein the first main body includes an edge portion which extends into the groove.

11. The trim panel assembly of claim 10, wherein the adhesive layer is positioned between the edge portion of the first main body and the groove.

12. The trim panel assembly of claim 8, wherein a side wall of the groove and the invisible surface of the door trim panel forms an angle, and wherein the angle is in a range of 85-90 degrees.

13. The trim panel assembly of claim 8, wherein each of the first leg portions passes through the corresponding first through-hole and extends on the invisible surface in a direction away the main body.

14. A method of assembling a local cover member to a vehicle trim panel, comprising:
forming a trim panel, the trim panel including a groove positioned on a first surface along a peripheral of an assembling area, and a plurality of through-holes positioned in the groove and spaced apart from each other;
forming a local cover member corresponding to the assembling area, the cover member including a main body and a plurality of leg portions extending from the main body, wherein the local cover member is made from one of leather, imitation leather or fiber material;
passing each of the leg portions through a corresponding through-holes and extending each of the leg portions on a second surface of the trim panel;
positioning the main body of the local cover member directly on the assembling area; and
connecting the plurality of leg portions of the local cover member to the second surface of the trim panel via an adhesive layer disposed between the plurality of leg portions and the trim panel.

15. The method of the claim 14, further comprising positioning an edge portion of the main body into the groove.

16. The trim panel assembly of claim 8, further comprising a second cover layer, wherein the second cover layer includes a second main body and a plurality of second leg portions, wherein the door trim panel further includes a second assembling area corresponding to the second cover layer, wherein the first assembling area has a common side with the second assembling area, wherein the door trim panel includes a second groove positioned on the visible surface along a peripheral of the second assembling area and a plurality of second through-holes positioned in the second groove and spaced apart from each other, and wherein the plurality of the second leg portions of the second layer pass through the plurality of the second through-holes and extend onto the invisible surface of the door trim.

17. The trim panel assembly of claim 16, wherein the first through-holes positioned in a portion of the first groove on the common side are configured to receive the corresponding first and second leg portions, and the second leg portions of the second cover layer corresponding to the common side pass through the corresponding first through-holes and extend on the invisible surface of the door trim panel.

18. The trim panel assembly of claim 16, wherein the first groove positioned on the common side is configured to receive an edge portion of the first cover layer and an edge portion of the second cover layer corresponding to the common side.

* * * * *